（12）United States Patent
Takahashi et al.

(10) Patent No.: US 7,249,405 B2
(45) Date of Patent: Jul. 31, 2007

(54) METHOD FOR MANUFACTURING A MAGNETIC MEDIUM

(75) Inventors: Yoshio Takahashi, Koganei (JP);
Yotsuo Yahisa, Odawara (JP);
Yoshiyuki Hirayama, Kokubunji (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 135 days.

(21) Appl. No.: 11/062,652

(22) Filed: Feb. 23, 2005

(65) Prior Publication Data
US 2005/0138796 A1    Jun. 30, 2005

Related U.S. Application Data

(62) Division of application No. 10/358,342, filed on Feb. 5, 2003, now Pat. No. 6,884,521.

(30) Foreign Application Priority Data
May 22, 2002 (JP) .............................. 2002-147963

(51) Int. Cl.
*G11B 5/127* (2006.01)
*H04R 31/00* (2006.01)

(52) U.S. Cl. .............................. 29/603.01; 29/603.03; 29/63.07; 29/609; 29/885; 204/192.15; 216/22; 216/39; 216/41; 216/48; 428/141; 428/409; 428/611; 428/653

(58) Field of Classification Search ............. 29/603.01, 29/603.03, 603.07, 609, 885; 204/192.15; 216/22, 39, 41, 48; 428/141, 409, 611, 653
See application file for complete search history.

(56) References Cited

U.S. PATENT DOCUMENTS 5,536,585 A    7/1996  Futamoto et al.

(Continued)

FOREIGN PATENT DOCUMENTS

JP    61-182624    2/1985

(Continued)

OTHER PUBLICATIONS

Y. Matsuda, Y. Yahisa, K. Sakamoto, Y. Takahashi,, A. Katou and Y. Hosoe, Noise Reduction by Surface Oxidization of a CoCrZr Seed Layer on Glass Substrates for CoCrPt/CrTi Thin Film Media, IEEE Transactions of Magnetics, vol. 35, No. 5 (Sep. 1999) pp. 2640-2642.

(Continued)

*Primary Examiner*—Paul D. Kim
(74) *Attorney, Agent, or Firm*—Reed Smith LLP; Stanley P. Fisher, Esq.; Juan Carlos A. Marquez, Esq.

(57) ABSTRACT

Disclosed is a magnetic recording medium and a method for manufacturing the same to provide a magnetic recording medium reducing medium noise and having excellent thermal stability. The magnetic recording medium includes a substantially amorphous seed layer and a polycrystal underlayer made of crystal grains having a substantially columnar structure, the polycrystal underlayer contacting thereto. In a boundary between the seed layer and the underlayer, fine grooves having a period up to as large as the magnetic layer crystal grain diameter are formed in the disc circumferential direction. Accordingly, the magnetic recording medium is allowed to have a grain shape with a value obtained by dividing the average grain diameter for the disc circumferential direction by the average grain diameter for the disc radial direction of no less than 0.5 and no more than 0.9, thus achieving simultaneously reduction of the medium noise and thermal stability.

6 Claims, 6 Drawing Sheets

U.S. PATENT DOCUMENTS

| | | | |
|---|---|---|---|
| 5,723,198 A * | 3/1998 | Hosoe et al. | 428/141 |
| 5,789,090 A | 8/1998 | Okumura et al. | |
| 5,875,082 A | 2/1999 | Takayama et al. | |
| 5,989,674 A | 11/1999 | Marinero et al. | |
| 2002/0058160 A1 | 5/2002 | Oikawa et al. | |
| 2003/0134153 A1 | 7/2003 | Lee et al. | |

FOREIGN PATENT DOCUMENTS

| | | |
|---|---|---|
| JP | 62-262217 | 5/1986 |
| JP | 2000-48358 | 2/1993 |
| JP | 7-14144 | 6/1993 |
| JP | 8-7250 | 6/1994 |
| JP | 7-311929 | 3/1995 |
| JP | 9-212855 | 2/1996 |
| JP | 10-269548 | 3/1997 |
| JP | 2002-100030 | 9/2000 |

OTHER PUBLICATIONS

T. Kanbe, I. Tamai, Y. Takahashi, K. Tanahashi, and Y. Hosoe, "Effects of Boron Addition to Underlayer for CoCrPt Media on Magnetic Characteristics and Microstructure", IEEE Transactions of Magnetics, vol. 33, No. 5 (Sep. 1997) pp. 2980-2982.

* cited by examiner

DISK CIRCUMFERENTIAL DIRECTION

FIG.3B

DISK CIRCUMFERENTIAL DIRECTION

METHOD FOR MANUFACTURING A MAGNETIC MEDIUM

CROSS-REFERENCE TO RELATED APPLICATIONS

This application is a Divisional of U.S. Ser. No. 10/358,342 filed Feb. 5, 2003, now U.S. Pat. No. 6,884,521. Priority is claimed based on U.S. Ser. No. 10/358,342 filed Feb. 5, 2003, which claims priority to Japanese Patent Application No. 2002-147963 filed on May 22, 2002.

BACKGROUND OF THE INVENTION

The present invention relates to a magnetic recording medium in which medium noise and thermal fluctuation are suppressed, and relates to a method for manufacturing the same.

Requirement of densification for a magnetic storage apparatus has been further increased in light of an increase in capacity, device miniaturization, reduction in the number of parts, and the like. In order to realize the densification in a magnetic storage apparatus, noise reduction in a magnetic recording medium is important in addition to enhancement of read sensitivity of a magnetic head performing recording/reproduction and improvement in a signal processing method for read back signals.

Presently, in a magnetic recording medium used in an in-plane recording system and mainly commercialized, a magnetic layer constituted of fine crystal grains mainly composed of Co has been used. In the in-plane recording system, recording is performed by magnetization in a substrate in-plane direction. In order to set a {11.0} plane of each magnetic crystal grain parallel to a substrate plane, Cr alloy crystal grains with a 001 direction preferentially oriented perpendicular to the substrate plane are used for an underlayer, and the magnetic crystal grains are controlled to be almost epitaxially grown on the Cr alloy crystal grains. Alternatively, in some cases, on the underlayer of a Cr alloy with the 211 direction preferentially oriented perpendicular to the substrate plane, each Co alloy crystal grain is controlled such that a {10.0} plane thereof is set parallel to the substrate plane. In either case, each magnetic crystal grain is controlled such that a C-axis thereof is oriented substantially parallel to the substrate plane. This is because the direction of the C-axis of the Co alloy crystal grain is an easy magnetization axis, and the magnetization is set to be directed to the substrate in-plane direction.

In order to realize the 001 orientation and the 211 orientation of the Cr alloy, a seed layer is formed between the substrate and the Cr alloy layer. For example, in a case of an Al—Mg alloy substrate, the preferred orientation in the 001 direction is realized by forming a film of the Cr alloy by sputtering at comparatively high temperature on a Ni—P film plated on the substrate. A method of forming a film of a Co—Cr—Zr amorphous alloy on a glass substrate and forming a film of the Cr alloy is also put into practice. In addition, there is a method of setting the Cr alloy to be 211 oriented using a film of a Ni—Al alloy formed at low temperature as the seed layer. As described above, since the magnetic crystal grains are almost epitaxially grown on the Cr alloy grown by controlling the crystal orientation, the shape and the grain diameter of the magnetic crystal grains are strongly affected by the shape and the grain diameter of the Cr alloy crystal grains. Generally, the individual shapes of the Cr alloy crystal grains or the Co alloy crystal grains are irregular, but are isotropic on the average.

Incidentally, in order to reduce medium noise, it is effective to make the grain diameter fine and reduce exchange interaction between the adjacent crystal grains. This is because, when the exchange interaction is small, the width of a magnetization transition region of a boundary portion between adjacent recording bits, which is one of factors of the medium noise, heavily depends on the crystal grain diameter in the magnetic layer. In order to make the crystal grain diameter fine, a method of making the crystal grain diameter of the underlayer fine is effective. This is because, as previously described, the magnetic crystal grains are almost epitaxially grown on the Cr alloy crystal grains, and the crystal grain diameter in the magnetic layer is heavily affected by the crystal grain diameter in the underlayer. For making the grain diameter of the underlayer crystal grains fine, reported were means of performing surface oxidization of the Co—Cr—Zr seed layer (IEEE Tran. Magn. Vol. 35, No. 5, (1999) 2640), means of adding B into the Cr alloy (IEEE Tran. Magn. Vol. 33, No. 5, (1997) 2980), and the like. It is possible to make the crystal grain in the magnetic layer fine by making the crystal diameter of the Cr alloy grain fine using those techniques. On the other hand, in order to reduce the exchange interaction among the grains, reported are means of segregating Cr in the crystal grain boundary, means of forming a physical space between the crystal grains, and the like. For realizing the former one, a magnetic layer obtained by adding B or $SiO_2$ into the Co—Cr—Pt alloy was examined (Japanese Unexamined Patent publication No. 7(1995)-311929) and then put into practice. The addition of B into the magnetic layer has an effect of making the size of the crystal grains of the magnetic layer itself fine. A combination of such crystal grains of the magnetic layer and the fine underlayer crystal grains makes it possible to effectively make the grain diameter of the magnetic grains fine and reduce the exchange interaction between the grains.

Such a method for reducing the medium noise, not limited to the in-plane recording medium, is the same in a perpendicular magnetic recording system, in which the direction of the recording magnetization is directed to a direction perpendicular to the substrate plane. For the magnetic recording medium for use in the perpendicular magnetic recording system, examination has been made of a magnetic recording medium using a magnetic layer similar to that for use in the in-plane recording medium, which is constituted of the Co alloy magnetic crystal grains, a magnetic recording medium using a magnetic layer constituted of crystal grains of an artificial lattice structure having Co and Pd, or Co and Pt alternately laminated, and the like. In such perpendicular magnetic recording media, making size of the crystal grains to be fine and reducing the exchange interaction are very important for reducing the medium noise.

In order to promote the densification in the magnetic storage apparatus, it is necessary to make the crystal grains fine. However, along with making the crystal grains fine, a problem of a so-called thermal fluctuation becomes noticeable, in which the recorded magnetization is attenuated with time by a thermal energy of about room temperature. As a technology for exceeding a limitation due to the thermal fluctuation involved in the fine crystal grains, a so-called anti-ferromagnetically coupled (AFC) medium is put into practice. In the AFC medium, the magnetic layer is composed of two layers or more with Ru interposed therebetween. Effective grain volume is increased by utilizing anti-ferromagnetically coupling between the upper and lower layers, and thermal stability is secured. Furthermore, a vertical recording system allowed to increase in thickness of the magnetic layer was proposed and a lot of examination thereof is made. In the case of the vertical recording, the higher the recording density is, the recording magnetization is more stable. Accordingly, the vertical recording is considered to be essentially suitable for high recording density.

In U.S. Pat. No. 5,989,674, disclosed is a technology for increasing shape anisotropy of the magnetic grains by providing fine grooves (texture) with a roughness period of about 150 nm on the substrate and forming acicular grains with an aspect ratio of about 2 to 6.

One among the dimensions of each crystal grain having a correlation with the medium noise is a crystal grain diameter in a track direction (a circumferential direction of the disc substrate) of a recorded bit pattern recorded by the magnetic head. This is because the width of the magnetization transition region of the boundary between the adjacent recorded bits depends on the grain diameter in the track direction, and is hardly affected by the grain diameter in a track width direction (a radial direction of the disc substrate). Therefore, if the shape of the grains is controlled so as to be elongated in the radial direction of the disc substrate, the small grain diameter and the large grain volume can be obtained simultaneously, and a thermally-stable medium can be realized while keeping the medium noise small.

The U.S. Pat. No. 5,989,674 described that the shape of the acicular magnetic crystal is elongated in the disc radial direction by providing substrate texture. However, with regard to the columnar magnetic crystal used in the existing magnetic recording medium, the examination by the inventors of the present invention has revealed that even if the magnetic layer is formed on the substrate simply subjected to texture treatment with various underlayers interposed between the substrate and the magnetic layer, the crystal grains with a shape as deformed in a specific direction with respect to the substrate plane are not formed. Furthermore, in the above-described US patent, there is no detailed description regarding the fine grooves for keeping the grain shape within a proper range and there is no description regarding a relation between the average grain diameter in the disc radial direction and that in the disc circumferential direction.

SUMMARY OF THE INVENTION

An object of the present invention is to provide a method of controlling a shape of crystal grains of a substantially columnar structure in an underlayer, and a shape of crystal grains in a magnetic layer, and making the average grain diameter of the magnetic grains in the track direction finer than the that in the track width direction and to provide a magnetic recording medium manufactured by the method including the magnetic crystal grains controlled within a proper range.

The above-described object is achieved by providing proper fine grooves having a period or a size controlled on a surface of a seed layer used for controlling a grain diameter and a preferred orientation of underlayer crystal grains with a substantially columnar structure.

A magnetic recording medium according to the present invention includes a disc substrate and a magnetic layer constituted of polycrystal grains with a substantially columnar structure, and a ratio $<Dc>/<Dr>$ of an average diameter $<Dc>$ of the polycrystal grains, constituting the magnetic layer, for a circumferential direction of the substrate to an average diameter $<Dr>$ thereof for a radial direction of the substrate is less than 1. The ratio $<Dc>/<Dr>$ is no less than 0.5 and no more than 0.9 at least in a position of an innermost track recording a magnetic recording pattern.

A magnetic recording medium according to the present invention includes a disc substrate; a first underlayer (corresponding to a seed layer) formed over the disc substrate; a second underlayer constituted of polycrystal grains with a substantially columnar structure and formed in contact with a top of the first underlayer; and a magnetic layer constituted of polycrystal grains with a substantially columnar structure and formed on the second underlayer. In the magnetic recording medium, the first underlayer includes fine grooves along a circumferential direction of the substrate in a boundary with the second underlayer. An average period of roughness of the fine grooves measured in a radial direction of the substrate is up to two times as large as an average crystal grain diameter of crystal grains of the magnetic layer measured in a direction perpendicular to a surface of the substrate, preferably up to as large as the average crystal grain diameter.

Preferably, the first underlayer is substantially amorphous. The ratio $<Dc>/<Dr>$ of an average diameter $<Dc>$ of the polycrystal grains of the magnetic layer for a circumferential direction of the substrate to an average diameter $<Dr>$ thereof for a radial direction of the substrate is less than 1, preferably no less than 0.5 and no more than 0.9. The ratio $<Dc>/<Dr>$ is no less than 0.5 and no more than 0.9 at least in a position of an innermost track recording a magnetic recording pattern.

The average roughness factor Ra of the fine grooves between the first underlayer and the second underlayer is no less than 0.3 nm and no more than 0.9 nm. The average diameter $<Dc>$ of the crystal grains of the magnetic layer for the circumferential direction of the substrate is not more than 10 nm.

The magnetic recording medium of the present invention may be a two-layer perpendicular magnetic recording medium. Specifically, the magnetic layer may have an easy magnetization direction directed to a direction substantially perpendicular to a surface of the substrate, and the magnetic recording medium may include a soft magnetic layer between the substrate and the first underlayer.

A method for manufacturing a magnetic recording medium according to the present invention includes the steps of laminating a substantially amorphous first underlayer, a second underlayer constituted of substantially polycrystal grains in contact with the first underlayer, and a magnetic layer; and forming fine grooves in a substantially circumferential direction of the substrate on a surface of the first underlayer. Here, the fine grooves have an average period of roughness up to two times as large as the average crystal grain diameter of the magnetic layer, preferably, up to the average crystal grain diameter of the magnetic layer.

The average roughness factor Ra of the fine grooves is no less than 0.3 nm and no more than 0.9 nm. The first underlayer and the second underlayer can be formed by sputtering. The method for manufacturing a magnetic recording medium may include the step of etching a surface of the first underlayer by sputtering, or etching a surface of the first underlayer using a cleaning solution, the first underlayer having the fine grooves formed thereon.

PREFERRED EMBODIMENTS OF THE INVENTION

A detailed description of the present invention will be made below for the present invention based on significant knowledge found by the inventor.

Figure 1:
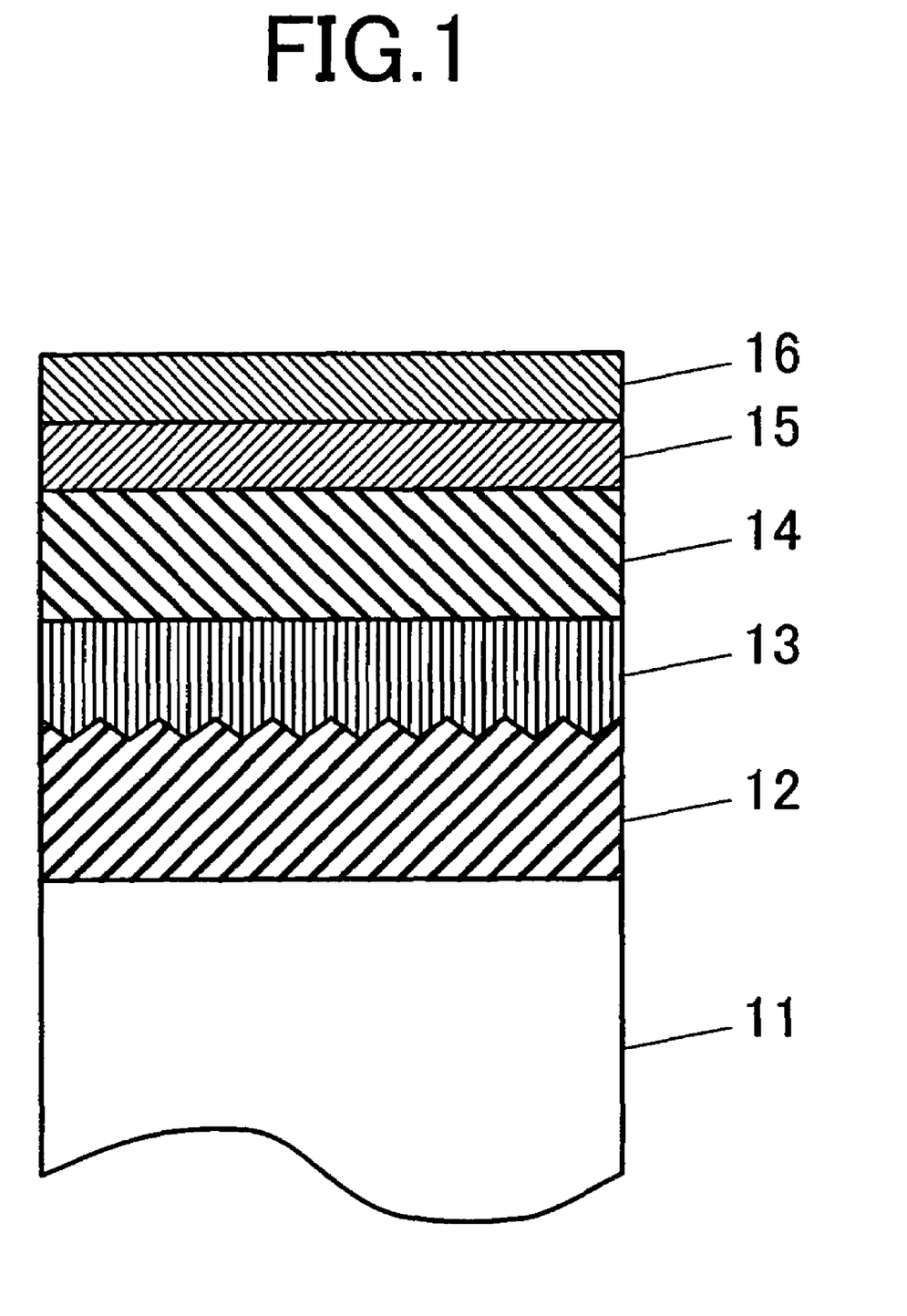
FIG. 1 is a view schematically showing a cross-sectional structure of a magnetic recording medium according to the present invention.

FIG. 1 is a cross-sectional view schematically showing a structure example of a magnetic recording medium according to the present invention. The magnetic recording medium of the embodiment includes a seed layer 12, an underlayer 13 and a magnetic layer 14, a protection layer 15, and a lubricant layer 16, which are laminated on a disc substrate 11.

The disc substrate 11 can employ a glass substrate with a surface that is chemically strengthened, a crystallized glass substrate, an Al—Mg substrate, a Si substrate, a carbon substrate, or the like. The seed layer 12 can employ the one mainly composed of NiP, NiTa, NiNb, NiCr, CoCr, CrTi, or the like, and the seed layer 12 can also employ the one obtained by adding a small amount of Zr or the like into each of the above described materials. Preferably, a structure of the seed layer is substantially amorphous. A topmost plane of the crystalline seed layer may be subjected to surface reformation to be amorphous, or the seed layer 12 may have a multilayer structure including an amorphous layer. The seed layer 12 is a layer for controlling a grain diameter and a preferred orientation direction of crystal grains in the underlayer formed thereon. In a surface of the underlayer 12, fine grooves are formed along the disc circumferential direction. The fine grooves can be formed by use of a known tape polishing machine. The fine grooves in the disc circumferential direction are formed by using a fine liquid containing diamond abrasive grains, pressing an abrasive tape against the disc, and rotating the disc. The abrasive time or the pressing force of the tape is adjusted to form desired grooves.

The underlayer 13 can employ Cr, and one obtained by adding Ti, Mo, V, W, Si, B, Ru, Al, Zr, Ge, Ta, or the like to Cr, and furthermore the underlayer 13 may employ Pd or Pt, and one obtained by adding B, C, SiO$_2$, or the like to Pd or Pt. The underlayer 13 may be constituted as a multilayer thereof. With regarding the structure of the underlayer grains, the crystal grains need to have a substantially columnar structure. The underlayer 13 is used for controlling the making of fine grain diameter and the crystal orientation, and further used for matching a crystal lattice constant with that of the magnetic layer 14 formed thereon. The magnetic layer 14 can employ CoCrPt, one obtained by adding B, Ta, Si, Cu, Zr, Nb, Ru, Ti, Ni, Fe, or the like to CoCrPt, and a stacking film of Co and Pt, or Co and Pd, a stacking film obtained by adding the B, C, Si or the like to the stacking film of Co and Pt or Co and Pd, or the like.

As the protection film 15, a layer mainly composed of C is formed. Furthermore, a lubricant such as perfluoroalkylpolyether or the like is applied as the lubricant layer 16. The materials constituting the magnetic recording medium is not limited to the above described materials, and it is sufficient if the materials for the seed layer, the underlayer, and the magnetic layer can control the grain diameter of the magnetic crystal grains.

Figure 2:
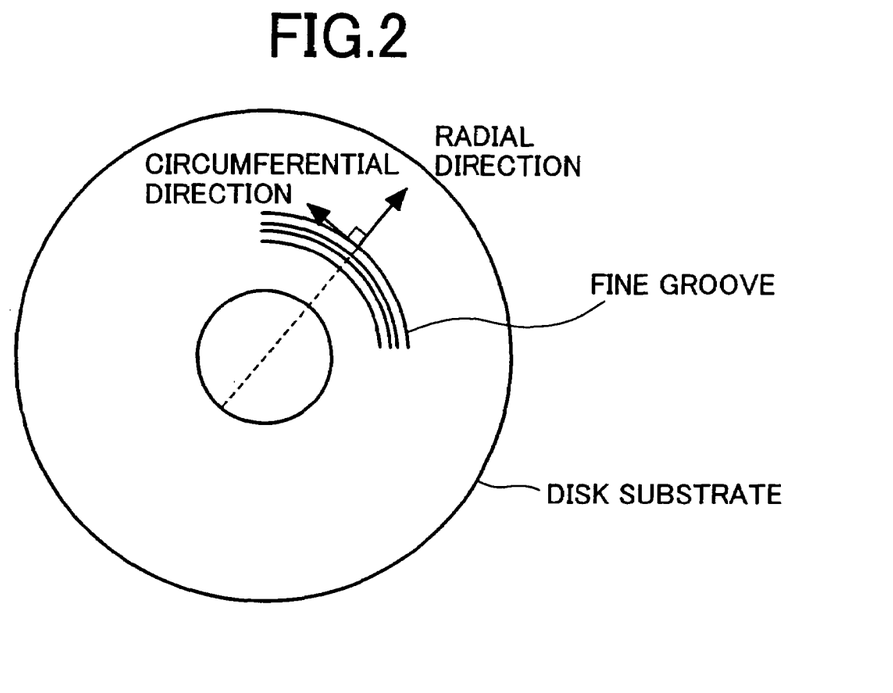
FIG. 2 is a view showing a relation of a disc substrate and fine grooves.
Figure 3A:
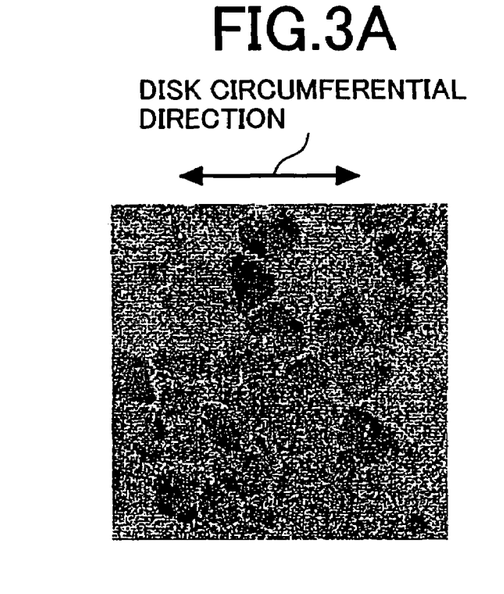
FIGS. 3A and 3B are views showing images of crystal grains of magnetic layers observed with a transmission electron microscope.
Figure 3B:
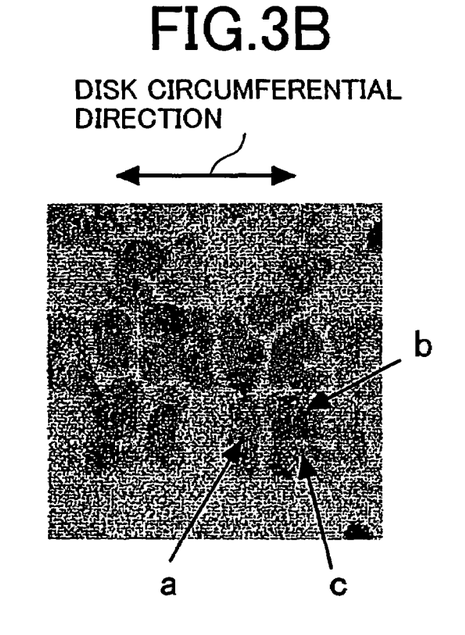

FIG. 2 is a view showing a relation between a disc substrate and a direction of fine grooves. The fine grooves are provided over the entire surface of the disc substantially along a disc circumferential direction, but it is unnecessary that each of the grooves is continuous along the disc circumferential direction. FIGS. 3A and 3B show images of the crystal grains in the magnetic layer in the case where the fine grooves are provided on the seed layer formed on the disc substrate.

FIGS. 3A and 3B show images of the magnetic crystal grains of the magnetic film photographed by use of a transmission electron microscope. Each portion of black contrast in the drawings corresponds to approximately one magnetic crystal grain. FIG. 3A shows the crystal grain image of the magnetic layer in the case where the fine grooves of about 50 nm period are provided on the seed layer, and FIG. 3B shows the crystal grain image in the magnetic layer in the case where the fine grooves of about 11 nm period are provided on the seed layer. The magnetic crystal grain image in the case where the fine grooves are not provided is omitted because there is no difference observed between the magnetic crystal grain image in the case without the fine grooves and that in the case with the fine grooves of about 50 nm period. Apparent from the drawings, only in the case with the fine grooves of about 11 nm period, the magnetic crystal grains are aligned in the fine groove direction. Furthermore, it is apparent that the comparatively large magnetic crystal grains are set lengthwise in the disc radial direction (in a direction substantially perpendicular to the fine grooves) in many cases. When the magnetic grain diameter for the disc radiation direction is decreased in such a manner, the width of the magnetization transition region is narrowed (see FIG. 6), thus forming a structure more suitable for high-density recording.

Figure 4:
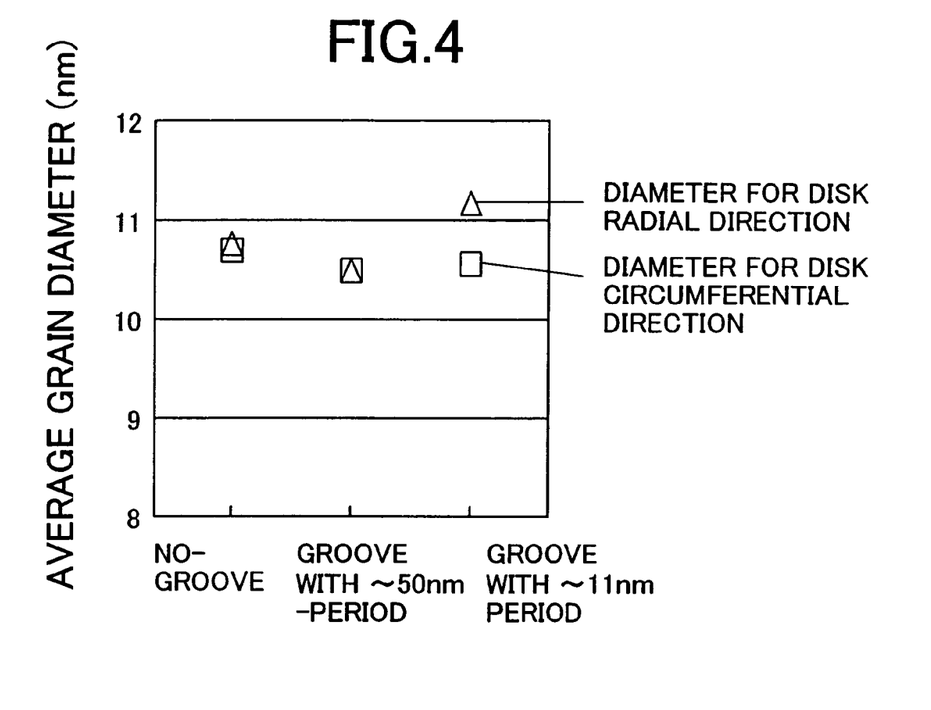
FIG. 4 is a graph plotting grain diameter for a disc radial direction and for a disc circumferential direction with respect to period of the fine grooves.

For more precise comparison of the grain diameter, FIG. 4 shows a graph plotting a ratio of the average grain diameter for the disc radial direction to the average grain diameter for the disc circumferential direction, which are determined from the lattice images of the crystal grains. In the case where the fine grooves are not provided on the surface of the seed layer and in the case where the fine grooves of long period are provided, there was no difference between the average grain diameter for the disc radial direction and the average grain diameter for the disc circumferential direction. However, when the period of the fine grooves are short, it was understood that the grain diameter for the circumferential direction becomes smaller than the grain diameter for the radial direction.

Figure 5:
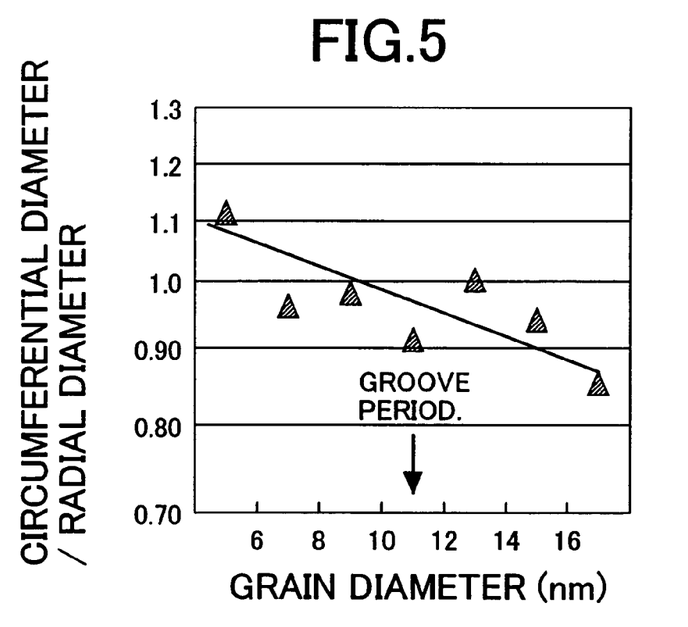
FIG. 5 is a graph plotting a value obtained by dividing the grain diameter for the disc circumferential direction and the grain diameter for the disc radial direction with respect to the period of the fine grooves.

FIG. 5 shows variation of an amount obtained by dividing the grain diameter for the disc radial direction by the grain diameter for the disc circumferential direction with respect to the grain diameter. For example, in the drawing, the grain diameter ratio of the crystal grain diameter of 7 nm is plotted by calculating the ratio of the average of the grain diameter for the circumferential direction to the average of the grain diameter for the radial direction regarding to a plurality of grains belonging to a range of the grain diameter of 6 nm to 8 nm. The grain diameter is defined as a diameter of a circle having the same area as each grain and determined from the crystal lattice image of the grains. FIG. 5 also shows average period of the fine grooves, which is obtained by analyzing a medium cross-sectional image obtained by observation of the transmission electron microscope. As apparent from FIG. 5, for the crystal grain with a diameter larger than the period of the fine grooves, the grain diameter for the circumferential direction is shorter than the grain diameter for the radial direction. Such tendency is increased as the grain diameter is relatively larger than the period of the fine grooves. On the contrary, for the crystal grain with a diameter smaller than the period of the fine grooves, the grain diameter for the circumferential direction is longer than the grain diameter for the radial direction.

The reason for causing such variation in grain shape can be considered as follows. With regard to growth of the grains, it is considered that the underlayer grains are grown around nucleation sites randomly formed on the seed layer. Subsequently, the magnetic grains are almost epitaxially grown on the underlayer grains while reflecting the shapes of the underlayer grains. At this time, it is considered that the nucleation sites are difficult to be formed in convex portions of the fine grooves, alternatively, the grain growth is difficult to occur even if the nucleation sites are formed. Therefore, the nucleation sites formed in the concave portion mainly serve as the nucleation sites of the grains. Accordingly, it can be considered that the nucleation site density in a direction parallel to the fine grooves is higher than the nucleation site density in a direction perpendicular to the fine grooves. Furthermore, there is a possibility that in the grains grown from the nucleation sites formed in the concave portions, growing speed in the direction perpendicular to the fine grooves becomes high because of stress of the substrate. Specifically, among the grains grown from the nucleation sites formed in the concave portion, the grain (indicated by a in FIG. 3b) intended to grow so as to have a crystal grain diameter larger than the roughness period of the fine grooves are grown lengthwise in the direction perpendicular to the fine grooves, that is, in the disc radial direction. On the other hand, when the nucleation sites are formed adjacent to each other in one of the concave portions of the fine grooves, the growth of the grains in the direction perpendicular to the fine grooves is suppressed by each other as grains indicated by b and c in FIG. 3B, and the grains are grown lengthwise in a direction parallel to the fine grooves, that is, in the disc circumferential direction. The shape of each of the grains is deviated from a circle to be a near-rectangular shape in many cases. It is also considered that this is because the shape of grains are grown so as to be squeezed in the disc radial direction by the concave portions of the fine grooves.

The reason for such deformation of the grain shape in the magnetic layer is that the grains of the Cr alloy underlayer in contact with the fine grooves are deformed. Generally, the grain diameter of the Cr alloy crystal grains and the grain diameter of the magnetic layer crystal grains are not the same, because the grains can take a bicrystal structure, where a plurality of crystal grains in the magnetic layer are grown on one Cr alloy grain with the crystal orientation thereof changed by about 90 degree. However, it is not preferable if the number of grains constituting the bicrystal structure is increased, because the width of a grain diameter distribution is increased. Accordingly, preferably, two or less of magnetic crystal grains are grown on one Cr alloy crystal grain, and more preferably, one magnetic crystal is grown on one Cr alloy crystal grain. In other words, the Cr alloy crystal grains and the magnetic crystal grains are the same in size. Therefore, in order to realize fine grain shape in the disc circumferential direction, it is necessary that the period of the fine grooves is not more than two times as large as the average grain diameter of the magnetic crystal grains, more preferably, not more than the magnetic crystal grain diameter.

Next, a description will be made of forming positions of the fine grooves and the seed layer material. Preferably, the forming positions of the fine grooves are located on a surface of the seed layer contacting the Cr alloy underlayer. At this time, preferably, the seed layer is substantially made of an amorphous material. This is because, when the desired fine grooves are formed on the substrate and then the seed layer of the amorphous material is formed, the fine groove of a period of about 10 nm, which is the average crystal grain diameter of the magnetic recording medium currently put into practice, is not transferred. The roughness height of the fine groove transferred on the seed layer becomes smaller than the roughness height on the substrate. For example, when the fine grooves are formed on the substrate, and then the amorphous layer with a thickness of 30 nm is formed, the fine roughness on the seed layer disappears and the height of the transferred roughness of comparatively long period is decreased to ⅔ or less. Similarly in the case of setting a thickness of the seed layer to 5 nm, the fine roughness disappears. Specifically, when the seed layer with a thickness of 5 nm or more is formed, the fine grooves formed on the substrate is not transferred onto the seed layer. Accordingly, the effect of controlling the grain diameter is reduced, and preferably, the fine grooves are directly formed on the seed layer.

On the other hand, in the case of using a crystalline seed layer (for example, NiAl), when the fine grooves are formed on the seed layer and then the Cr alloy underlayer is formed thereon, the Cr alloy crystal grains are grown in accordance with the crystalline orientation of the seed layer crystal grains. Accordingly, the grain shape of the Cr alloy underlayer is not affected by the fine grooves, and follows the shape of the seed layer crystal grains. The crystalline seed layer as NiAl generally needs to be formed thick so that the preferred orientation of the crystal axis is directed to the 211 direction. Even if the fine grooves are formed on the surface of the substrate, it is difficult to give an effect of the fine grooves to the surface of the seed layer. Consequently, the place where the fine grooves exist is preferably on the amorphous seed layer contacting the Cr alloy under layer.

Incidentally, the thermal stability of the magnetic recording medium is characterized by a value $Ku \cdot V/k \cdot T$ obtained by dividing a product of a uniaxial magnetic anisotropy constant Ku of the magnetic crystal grain and a volume V thereof by a product of the Boltzman constant k and the absolute temperature T. When the value of $Ku \cdot V/k \cdot T$ is not less than 60, the magnetic recording medium is considered to be thermally stable (Japanese Unexamined Patent Publication No. 10(1998)-269548). In order to enhance the thermal stability while keeping the crystal grains fine, it can be conceived to increase the Ku value or increase the film thickness. However, the Ku value is decided depending on the material thereof. In the case of using the Co alloy crystal grains, the Ku value can be increased by reducing the contained amount of Cr. However, the reduction of the amount of the Cr is not preferable since the exchange interaction between the grains is strengthened. Generally, crystal grains having a columnar structure increase in grain diameter in the process of growing in the thickness direction, so that it is difficult to realize the fine grain diameter in a thick film. Even if the fine grain diameter is realized in the thick film, the effective center of the magnetic film becomes far from the surface of the magnetic film, and a recording resolution is reduced when the recording/reproduction is performed by the use of a magnetic head. Therefore, the recording/reproduction with the high recording density becomes difficult. These problems can occur similarly even in the AFC medium or in the perpendicular recording medium.

The volume V of the magnetic grain can be expressed by a product of an area of the grain measured by observation in the disc perpendicular direction and the thickness of the magnetic film. As a typical value, in the case of a grain diameter for the circumferential direction of 8 nm, a grain diameter for the radial direction of 9 nm, a film thickness of 18 nm, and an amount of the uniaxial magnetic anisotropy of $2\times10^5$ J/m$^3$, the value of Ku·V/k·T is about 62, which is a sufficient value for thermal stability. Since the shape of the grain approximates a rectangle, the area of each grain is determined as a product of the grain diameter for the circumferential direction and the grain diameter for the radial direction. On the other hand, with regard to the grain in the case without the fine grooves formed, assuming a circular grain with a grain diameter of 8 nm, the value of Ku·V/k·T is about 44, which is not a sufficient value for the thermal stability. Even in the case of keeping the grain diameter in the circumferential direction unchanged, the thermal stability can be secured by increasing the grain diameter in the disc radial direction. At this time, a value (hereinafter, referred to as a directional grain aspect ratio) obtained by dividing the grain diameter for the disc circumferential direction by the grain diameter for the disc radial direction is about 0.9. Adversely, in the case where the grains different in deformation direction are formed, the grains increasing in grain diameter for the disc circumferential direction and making grain diameter for the disc radial direction fine, the value of Ku·V/k·T is about 62, which is sufficient for the thermal stability. However, since the grain diameter for the disc circumferential direction is increased, the medium noise is increased by 0.5 dB or more, so that such a case is not preferable.

Figure 6A:
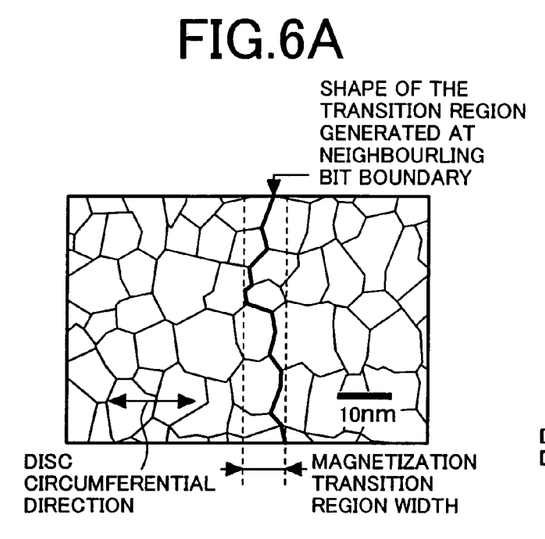
FIG. 6A is a view showing an image of a crystal grain boundary in a case where the grain diameter for the disc circumferential direction is smaller than that for the disc radial direction.
Figure 6B:
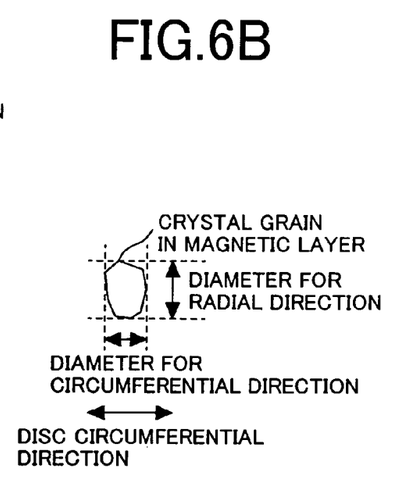
FIG. 6B is a view showing an image of the crystal grain boundary in a case where the grain diameter is isotropic.
Figure 6C:
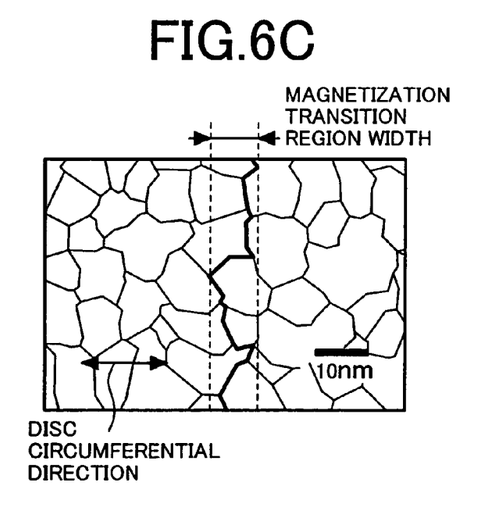
FIG. 6C is a view showing a definition of the grain diameters.

A description will be further made. The directional grain aspect ratio more than 0.9 means that the grain diameter in the disc circumferential direction is larger than that in the case of the directional grain aspect ratio of 0.9 or less. Accordingly as shown in FIGS. 6A and 6C, the increase in the grain diameter in the disc circumferential direction causes increase in the width of the magnetization transition region formed between the neighboring recorded bits, increase in the medium noise, and reduction of the signal to noise ratio, so that high recording density cannot be realized. The recording density of the magnetic disc device currently put into practice is about 50 gigabits per square inch. An improvement in recording density to 60 gigabits per square inch or more means an increase by 20% or more. Specifically, the minimum recording bit needs to increase in size in the disc circumferential direction by 10% or more and made fine in the disc radial direction by 10% or more. When the size of the recording bit is made fine in the disc radial direction by 10% or more, in order to obtain a medium signal-to-noise ratio equivalent to or more than that in the case where the recording bit is not made to be fine, preferably, the number of grains between the neighboring magnetic transition regions of the recording bit, which is made to be fine, in the length direction is equal to or more than that in the case where the recording bit is not made fine. Specifically, the grain diameter for the disc circumferential direction needs to be 90% or less of that of a grain of the anisotropic shape. At this time, assuming that the grain diameter for the disc radial direction is not changed, the directional grain aspect ratio is 0.9 or less. On the other hand, description will be made of an absolute value of the grain diameter. In the in-plane recording system, to realize the high recording density, the grain diameter (a size of magnetic reversal) for the disc circumferential direction is preferably 10 nm or less. Taking into an account weak exchange coupling between the grains, the grain diameter for the disc circumferential direction of 8 nm or less is more preferred.

On the other hand, when the directional grain aspect ratio is less than 0.5 and the grain is extremely elongated, the effect of shape magnetic anisotropy becomes noticeable in some cases. For example, assuming that the grain shape is a spheroid, for which a demagnetizing factor can be strictly calculated, when the directional grain aspect ratio is 0.5, the demagnetizing factor is about 0.24. In this case, with regard to the grains which have the uniaxial magnetic anisotropy constant Ku of about $1\times10^5$ J/m$^3$ because of high stacking fault density in the magnetic grain or lattice distortion, values of the shape magnetic anisotropic energy and crystal magnetic anisotropic energy are substantially equal to each other. Specifically, there appears a tendency for magnetization to be easily directed in the longitudinal direction (in the disc radial direction) of the grain, and such a grain is not preferable for the grains for performing the magnetic recording. Consequently, it is not preferable that the directional grain aspect ratio is less than 0.5.

Next, a description will be made of a method of measuring the crystal grain diameter. The measurement of the crystal grain diameter is carried out by means of observation of the crystal grain image with the transmission electron microscope and image analysis thereof. First, a sample of the magnetic recording medium of about 2 mm square is cut out to be a small piece. The small piece is polished on the substrate side to prepare an ultrathin film locally composed of the magnetic layer and the protection layer. The thin film sample is observed from the perpendicular direction to the substrate plane by use of the transmission electron microscope, and a crystal lattice image of the magnetic film crystal grains is photographed. In the lattice image, portion of uniform crystal orientation is considered as one crystal grain and a crystal grain boundary image is formed. FIG. 6A shows a crystal grain boundary image of the magnetic crystal grains of the magnetic disc according to the present invention observed with the transmission electron microscope, in which the grain diameter for the disc circumferential direction is smaller than the grain diameter for the disc radial direction. FIG. 6C shows a crystal grain image in a case where the magnetic film crystal grains are isotropic. In FIGS. 6A and 6C, a line as a boundary of the neighboring recorded bits and a width of the magnetization transition region are shown for convenience. It is apparent that the width of the magnetization transition region of the magnetic disc of the present invention shown in FIG. 6A is narrower than that of the conventional magnetic disc shown in FIG. 6B.

Subsequently, the resultant crystal grain boundary image is scanned into a personal computer by a scanner to be digital data. The scanned image data is measured by use of commercially available grain analysis software to calculate the maximum number of pixels in the disc radial direction and the maximum number of pixels in the disc circumferential direction for each grain and obtain the grain diameter for the disc radial direction and the grain diameter for the disc circumferential direction for each grain based on conversion of the number of pixels and a real scale (FIG. 6B) The measurement is performed for three hundreds crystal grains or more to calculate an average grain diameter <Dr> for the disc radial direction and an average grain diameter <Dc> for the disc circumferential direction as arithmetic averages of the resultant grain diameter. On the other hand, the average diameter not specifying a direction is defined as a diameter of a circle having the same area as that of the each grain.

Preferably, the above described measurement of the grain diameter is performed at a position of an innermost track of a disc medium, where a recording pattern of disk shaped medium is recorded. This is because the relative speed with respect to the magnetic head is lower in the disc inner circumference portion than that in an outer circumference portion, and when the record is written at the same recording frequency, the recording density is high in the innermost track position. In other words, restrictions for the medium noise are particularly severe on the disk inner circumference side, and the requirement for the magnetic grain to be made fine in the grain diameter is stronger on the inner circumference side. Accordingly, it is necessary to perform the measurement of the grain diameter at the disc innermost track position, where it is required more strongly to increase the ratio of the grain diameter for the disc circumferential direction to the grain diameter for the disc radial direction.

Next, a description will be made for a method for measuring the period of fine roughness generated in the disc radial direction due to the fine grooves. The measurement of the roughness period is also performed by analysis of an image observed by the transmission electron microscope. First, a small piece of about 2 mm square is cut out from the vicinity of the small piece cut out for the measurement of the grain diameter. The small piece is polished to be made into a thin film in the cross-sectional direction of the magnetic recording medium with a thickness of 100 nm or less. At this time, in order to observe the shape of the fine grooves formed in the disc circumferential direction, the thin film is formed so as to include a plane orthogonal to the disc circumferential direction. The thin film is observed with the transmission electron microscope to obtain an image of a cross-sectional structure of the magnetic disc.

Figure 7:
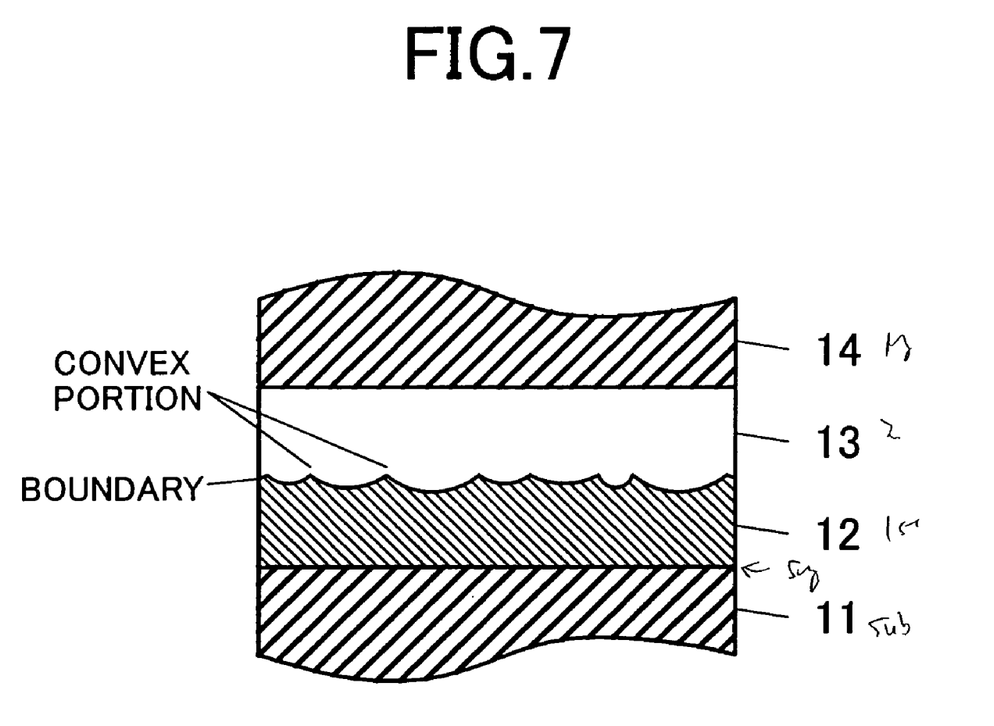
FIG. 7 is a view schematically showing a boundary between a seed layer and an underlayer.

FIG. 7 is a view schematically showing a boundary portion between the seed layer and the underlayer in the cross-sectional image of the magnetic disc. Avoiding a large convex portions with a height of 6 nm or more rarely appearing in the boundary portion between the seed layer 12 and the underlayer 13, the number of convex portions with a height of 0.5 nm or more formed in a region of about 200 nm wide in the boundary direction is counted. A length between the convex portions at the both end within the analyzed region is divided by a value obtained by subtracting 1 from the measured number of convex portions to obtain an average roughness period. In the measurement of the average roughness period, if the contrast in the boundary portion with roughness is not clear, the measurement of the period may be performed after scanning the cross-sectional image into the personal computer for digitization, and then applying a filter (sobel filter, variance filter, etc.) for adding emphasis on the border portion. The height between the neighboring convex and concave portions is measured in the analyzed region, and the average roughness factor Ra of the fine groove roughness is defined as a half of the average value of the height. On the other hand, the convex portions with a height of 6 nm or more are eliminated because of the following reason. Generally, the length between the neighboring convex portions is several times or more larger than the height of the convex portion. Accordingly, in the portion with the convex portions having a height of 6 nm or more, the roughness period is several tens nm or more. As previously described, with such a long period, there appears no effect of the grain deformation. Moreover, since the ratio of such large roughness portion to the entire disc is low, the exclusion of the large roughness portion includes a small effect on the average.

Figure 8A:
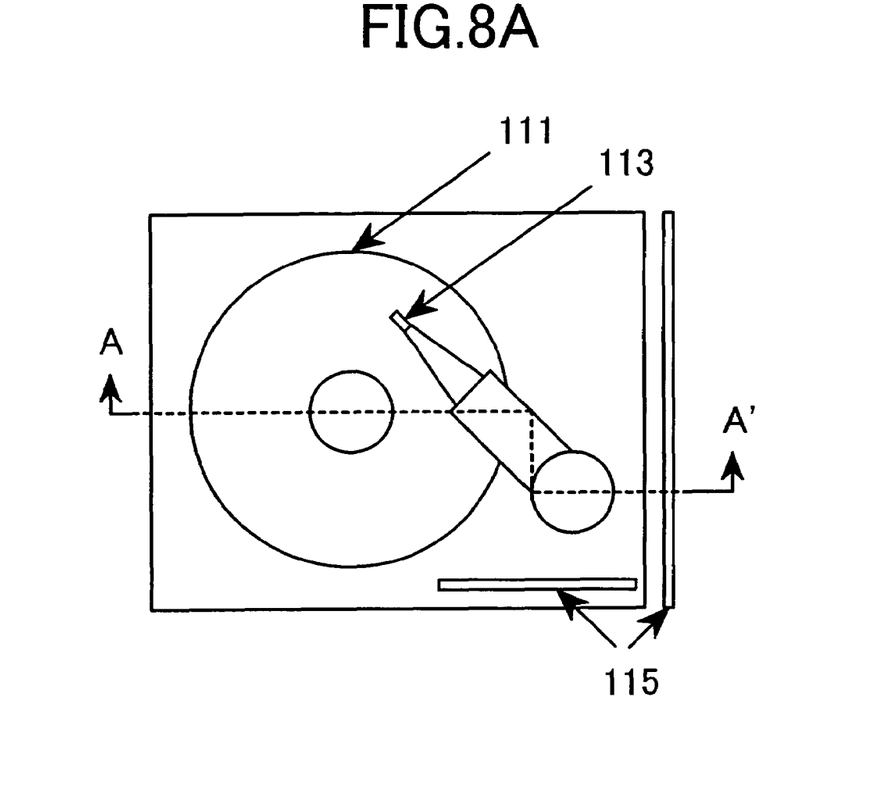
FIGS. 8A and 8B are views showing an inside and a cross-section of a magnetic storage apparatus used in the present invention.
Figure 8B:
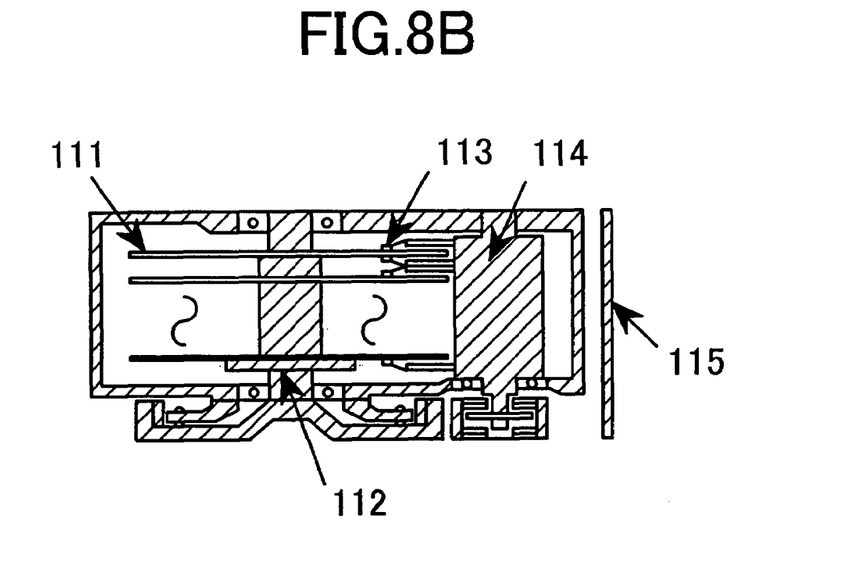

FIGS. 8A and 8B are views schematically showing a magnetic storage apparatus using the above described magnetic recording medium. Specifically, FIG. 8A is a schematic top plan view showing an inside of the apparatus, and FIG. 8B is a schematic cross-sectional view taken along a line A-A' in FIG. 8.

The magnetic storage apparatus includes a magnetic recording medium 111, a drive unit 112 for driving the magnetic recording medium in the recording direction, a magnetic head 113 for performing reading/writing of record, a drive unit 114 for driving the magnetic head, and a signal processing unit 115 for controlling signals for recording and reproduction. A cross-section of the magnetic head for reading record is constituted of an element having a high magnetoresistive effect, so that sufficient signal strength can be obtained at high recording density. Accordingly, a magnetic storage apparatus with a recording density exceeding 60 gigabits per 1 inch square can be realized. Preferably, the element having a high magnetoresistive effect is an element utilizing a giant magnetoresistive effect or a spin valve effect, or an element utilizing a tunnel magnetoresistive effect.

With regard to the fine groove roughness, preferably, the average roughness factor Ra is not less than 0.5 nm and not more than 3 nm. This is because if the roughness height is too small, the above described change in the grain shape is difficult to be caused by the roughness. If the roughness height is too large, a possibility that the magnetic head floating over the medium contacts the convex portion in the recording/reproduction is increased. Since the maximum roughness height is about ten times larger than the average roughness factor Ra, in order to lower the floating height of the magnetic head, the average roughness factor Ra cannot be enlarged. Moreover, since the roughness period is several times larger than the height of the fine groove roughness, it is difficult that the roughness period is set equal to or less than a grain diameter of the crystal grain. After forming the fine grooves by use of the tape polishing machine, cleaning of the surface and drying thereof are necessary. In order to sequentially laminate the underlayer, the magnetic layer, and the like, after the disc substrate is introduced into a deposition apparatus, an oxide-film or impurities on the surface may be removed by once sputtering the surface of the fine grooves. The sputtering of the surface of the fine grooves allows the height of the fine groove roughness to be increased.

EXAMPLE 1

A magnetic disc of which cross-sectional view is schematically shown in FIG. 1 was prepared. First, on a chemically strengthened glass substrate 11 subjected to surface cleaning using alkaline solution, a NiTa37.5Zr10 film was deposited having a thickness of 30 nm as the seed layer 12. Here, the numeral 37.5 after Ta and the numeral 10 after Zr in NiTa37.5Zr10 indicate concentrations of Ta and Zr contained in the film in atom percent, respectively. Specifically, NiTa37.5Zr10 is an abbreviation of 52.5 at. % Ni—37.5 at. % Ta—10 at. %. An indication without numerals such as NiTaZr is an abbreviation showing a same composition as the preceding film containing the same elements. Hereinafter, similar abbreviation is made.

Subsequently, the substrate having the NiTaZr deposited thereon was taken out from the deposition apparatus. The fine grooves in the substrate circumferential direction were formed on the NiTaZr surface using an abrasive with an average abrasive grain diameter of 0.13 µm or less by means of the tape polishing machine. After the substrate having the fine grooves formed thereon was cleaned and dried, the NiTaZr surface was etched by sputtering using Ar gas in the deposition apparatus. After heating the substrate to about 250° C., CrTi15B3 was deposited in a thickness of 10 nm as the underlayer 13. Sequentially, a CoCr18Pt14B6 magnetic film was deposited in a thickness of 16 nm as the magnetic layer 14, and C was deposited in a thickness of 5 nm as the protection layer 15.

From the disc inner circumference portion of the above described magnetic recording medium, a small piece of about 2 mm square was cut out and made into a thin film. A plane lattice image (about two million magnifications) of the crystal grains of the magnetic film was photographed by use of the transmission electron microscope. The average crystal grain diameter measured 9.1 nm from the image of the transmission electron microscope. Part of the magnetic recording medium in the vicinity of the part previously cut out was cut out and made into a thin film in a cross-sectional direction, and then observed with the transmission electron microscope. The observation confirmed that each grain in the CrTiB layer and the CoCrPtB layer had a substantially columnar structure, and the NiTaZr layer was amorphous. With regard to the fine grooves in the disc circumferential direction in the boundary between the NiTaZr layer and the CrTiB layer, roughness measured in the disc radial direction had the average roughness factor Ra of about 0.8 nm and the average period of about 9.0 nm. In other words, the ratio of the roughness period to the average roughness factor Ra was about 10/1. In the plane lattice image, the average crystal grain diameter measured 8.9 nm in the disc circumferential direction and 10.5 nm in the disc radial direction. In other words, the ratio of the average grain diameter in the disc circumferential direction to the average grain diameter in the disc radial direction was 0.85. It was understood that the ratio of the grain diameter was 0.9 or less because the average roughness period was less than the average crystal grain diameter or less. In this connection, the coercivity of the medium of the present invention measured 3800 Oe with a vibrating sample magnetometer. The value of Ku·V/k·T obtained from dependency of remanence coercivity on a magnetic field application time was 78. Consequently, the thermal stability was considered sufficient.

On the other hand, a medium was prepared for comparison, in which the layer structure and the film formation conditions are the same as those of example 1, though the fine grooves were not formed. The average grain diameter of the magnetic film measured 9.4 nm. The ratio of the average grain diameter for the disc radial direction to the average grain diameter for the disc circumferential direction was 0.99, which was considered to be within a measuring accuracy, and there was no difference in the grain diameter depending on the direction with respect to the disc. In other words, the grain shape was isotropic.

For further comparison, another medium was prepared, in which the fine grooves were provided directly on the substrate, and the other layer structure and the film formation conditions are the same as those of example 1. The average grain diameter of the magnetic layer measured 9.4 nm. The ratio of the average grain diameter in the disc radial direction to the average grain diameter in the disc circumferential direction was 1.0. In other words, there was no difference from the medium where the fine grooves were not provided. In the case where the fine grooves were provided directly on the substrate and the amorphous NiTaZr layer was formed, the fine grooves were not transferred to the surface of the NiTaZr film, so that the grain shape was isotropic. In this connection, from the transmission electron microscope images of the media of the two types prepared for comparison and the medium of the present invention, comparison was made for a degree of in-plane orientation of the crystal grains, and there was no difference observed.

On the medium provided with the fine grooves according to the example 1, the lubricant layer 16 of perfluoroalkyl-polyether type was formed. The resultant medium was mounted in the magnetic storage apparatus shown in FIGS. 8A and 8B and the evaluation of the recording/reproduction characteristics was carried out. The magnetic head was a merged magnetic head of an electromagnetic induction type magnetic head for recording and a giant magnetoresistive effect type magnetic head for reproduction. The gap length between write poles was 0.11 µm, and the effective track width was 0.29 µm. The effective track width of the reproduction section was 0.25 µm, the shield interval was 0.08 µm, and the distance between the magnetic head and the medium was 20 nm. Recording/reproduction was performed using this magnetic head under the recording/reproduction condition of 60 gigabits per 1 inch square. The ratio (S/N) of a signal output of a solitary wave to medium noise of 22.1 dB was obtained. The overwrite characteristic of 35 dB or more was obtained. The bit error rate was not more than $10^{-5}$, and it could be confirmed to achieve a recording density of 60 gigabits per 1 inch square or more.

EXAMPLE 2

Next, a description will be made of an example having a medium constitution in which the seed layer 12 employs a NiP plate, and the magnetic layer 14 employs the AFC constitution with Ru interposed therebetween.

A substrate obtained by sputter-depositing Cr on the chemically strengthened glass substrate 11 in a thickness of 10 nm was plated with Ni—P to a thickness of about 100 nm by a known plating process. The resultant structure was polished in the circumferential direction using diamond abrasive grains with a grain diameter of 11 µm or less by use of the tape polishing machine to form the fine grooves in the disc circumferential direction. After the making of the fine grooves, the surface thereof was cleaned and dried, and then the substrate was introduced in the deposition apparatus. On the substrate heated to about 300° C. with an infrared lamp heater, a CrTi10B7 layer was deposited to a thickness of 10 nm. Sequentially, CoCr14Pt4 was deposited to a thickness of 3 nm as a first magnetic layer, and Ru for anti-ferromagnetically coupling the upper and the lower magnetic layers was deposited to a thickness of 0.5 nm, CoCr20Pt14B8 was deposited to a thickness of 15 nm as a second magnetic layer, and C was deposited to a thickness of 4 nm as the protection film 15.

A small sample of about 2 mm square was cut out from the disc inner circumference portion of this medium. After the sample is made into a thin film from the substrate side, a plane lattice image of the second magnetic layer was photographed with the transmission electron microscope. Three hundreds or more grains were extracted from the lattice image and analyzed, and an average grain diameter of 8.9 nm was obtained. A sample for cross-sectional observation was cut out from the vicinity of the portion, which was previously cut out, to be made into a thin film, and a cross-sectional structure image was observed. The CrTiB layer and the CoCrPtB/Ru/CoCrPt magnetic layer had crystal grains with a columnar structure, and were structured in such a manner that the crystal orientations of the underlayer grain and the magnetic layer grain were continuously connected to each other. From the cross-sectional structure image, roughness was formed in the boundary between the NiP plate and the CrTiB layer. The average roughness factor of the roughness measured in the disc radial direction was 0.7 nm and the period thereof was about 8.0 nm, which is the period of the fine groove roughness. The average grain diameter measured in the circumferential direction was 7.8 nm, and the average grain diameter measured in the disc radial direction was 9.0 nm. In other words, the directional grain aspect ratio was 0.87.

The static magnetic characteristics of this medium were evaluated with a vibrating sample magnetometer and a torque meter. The product Mst of saturation magnetization and film thickness and the anisotropy field Hk were 8.1 Tesla·nm and 12.1 kOe, respectively. The product of the effective magnetic anisotropy constant Ku and the grain volume V is obtained by Ku·V=Hk·Mst·S/2 using the product Mst of saturation magnetization and film thickness, the anisotropy field Hk, and an average grain area S. The value Ku·V/k·T obtained by dividing the calculated value KuV by the product of the Boltzmann constant K and the absolute temperature T was about 66.

On this medium, the lubricant layer 16 of perfluoroalkyl-polyether type was formed. The resultant medium was mounted in the magnetic storage apparatus shown in FIGS. 8A and 8B, and the evaluation of the recording/reproduction characteristics was carried out. The magnetic head was a merged magnetic head of an electromagnetic induction type magnetic head for recording and a giant magnetoresistive effect type magnetic head for reproduction. The gap length between write poles was 0.11 μm, and the effective track width was 0.29 μm. The effective track width of the reproduction section was 0.25 μm, the shield interval was 0.08 μm, and the distance between the magnetic head and the medium was 20 nm. Recording/reproduction was performed using this magnetic head under the recording/reproduction condition of 60 gigabits per 1 inch square. The overwrite characteristic of 35 dB or more was obtained. The bit error rate was not more than $10^{-5}$, and it could be confirmed to achieve a recording density of 60 gigabits per 1 inch square or more. In addition, for the medium of example 2, a decreasing rate of a reproduced output over time was measured. The decreasing rate obtained by measuring the output reproduced from the record of the maximum linear recording density after 100 hours was not more than 2%. This medium was confirmed to be sufficiently suitable for maintaining record for a long period.

COMPARATIVE EXAMPLE

Here, examples which have the fine grooves formed directly on a chemically strengthened glass substrate will be described.

On chemically strengthened glass substrates 11, the fine grooves were formed with the tape polishing machine using the diamond abrasive grains with an average grain diameter of 0.13 μm or less. Subsequently, the substrates were cleaned with alkali solution, and as the seed layer 12, substantially amorphous CoCr40Zr10 layers were deposited thereon to a thickness of 5 nm and a thickness of 30 nm, respectively, without heating the substrates to form discs in the deposition apparatus. For each of the discs, a small piece of about 2 mm square was cut out from the disc inner circumference portion. Then, the roughness of the surface of the each seed layer along the disc radial direction was measured with the transmission electron microscope. In the disc having the 5 nm thick CoCrZr layer formed, the average roughness factor Ra was 0.7 nm, and the average roughness period was about 20 nm. Examination of a relation between the roughness formed on the glass substrate and the roughness on the surface of the CoCrZr layer reveals that the roughness with a period of 10 nm or less was not transferred to the surface of the CoCrZr layer and the roughness with long period was transferred. In the measurement of the disc having the 30 nm thick CoCrZr layer formed, fine roughness was not observed, and the average roughness period increased to about 40 nm. In other words, it would be considered that the fine roughness formed on the substrate was not transferred to the seed layer due to the formation of the amorphous layer.

The surface of the each seed layer was once sputtered. After heating the resultant substrate to 250° C., the surface thereof was oxidized with Ar gas containing 1 at. % of $O_2$. Subsequently, a Cr layer with a thickness of 7.5 nm and a CrTi20 layer with a thickness of 12.5 nm were continuously laminated, and further a $CoCr_{20}Pt_6$ magnetic layer with a thickness of 20 nm, and a C protection layer with a thickness of 5 nm was laminated. In the medium having the fine grooves formed directly on the substrate and the 30 nm thick seed layer formed, the average grain diameter measured using the transmission electron microscope was 12.6 nm, and the average directional grain aspect ratio was 1.01. In other words, in the case where the polycrystal Cr/CrTi underlayer composed of crystal grains of the columnar structure was not formed directly on the fine grooves with a period shorter than the average grain diameter of the magnetic layer, the grain shape short in the disc circumferential substrate could not be achieved. In the medium having the 5 nm thick seed layer formed, the average grain diameter of the magnetic grains and the average directional grain aspect ratio agreed within the error range with those in the case of forming the 30 nm thick seed layer, and the grain shape short in the disk circumferential disc could not be achieved.

EXAMPLE 3

Next, a description will be made of an example of a two-layer perpendicular magnetic recording medium to which the present invention was applied.

On the crystallized glass substrate 11, first, a NiTa37.5Zr10 film was deposited to a thickness of 30 nm. Subsequently, a FeTa10C16 soft magnetic layer was deposited to a thickness of 400 nm. The soft magnetic layer could be constituted by fixing the magnetization direction or adding a plurality of layers controlling crystallinity. After the formation of the soft magnetic layer, the resultant structure was heated to about 330° C. with the infrared lamp to deposit a crystal layer within the soft magnetic layer and improve the soft magnetic property. A NiTa37.5Zr10 layer with a thickness of 5 nm was laminated as the seed layer 12, and the resultant structure was taken out from the deposition apparatus after the substrate temperature was lowered to a degree of room temperature. Subsequently, the fine grooves in the substrate circumferential direction were formed with the tape polishing machine using abrasive grains with an average abrasive grain diameter of 0.11 μm or less. The resultant structure having the fine grooves formed was cleaned and dried, and the surface thereof was then etched by sputtering using Ar gas in the deposition apparatus. The resultant structure was heated to about 250° C., and a PdB10 layer was deposited to a thickness of 5 nm as the underlayer 13. Successively, a Co layer with a thickness of 0.3 nm and a Pd layer with a thickness of 1.0 nm were alternately laminated as the magnetic layer 14 such that the total thickness of the laminated part of the Co and Pd layers were 20 nm. Subsequently, C is deposited to 5 nm as the protection layer 15.

In observation of the magnetic layer in the medium of this example with the transmission electron microscope, physical space was observed between the individual grains, and the shapes of the grains were clearly elongated in the disk radial direction. In observation of the cross-sectional image of the medium with the transmission electron microscope, fine grooves were observed between the NiTaZr layer formed on the soft magnetic layer and the PdB underlayer. The roughness period thereof measured in the disc radial direction was 9.0 nm, and the average roughness factor Ra was about 0.8 nm. The average grain diameter of the magnetic grains was 13.3 nm, the average grain diameter measured in the disc circumferential direction was 10.9 nm, and the average grain diameter measured in the disc radial direction was 12.8. nm. In this connection, the variance of the grain diameter defined with the value obtained by dividing the standard deviation of a distribution of the grain diameter by the average grain diameter was 23%, which is extremely decreased compared with the grain diameter variance of a general magnetic layer composed of CoCrPt alloy crystal grains of about 30%.

On the medium of this example, the lubricant layer 16 of perfluoroalkyl-polyether type was formed. The resultant medium was mounted in the magnetic storage apparatus shown in FIGS. 8A and 8B, and the evaluation of the recording/reproduction characteristics was carried out. The recording/reproduction was carried out under the condition of the head floating amount of 10 nm using a single pole head as the magnetic head for recording with a track width of 0.18 μm and using a GMR head as the magnetic head for reproduction with a shield interval of 0.07 μm and a track width of 0.14 μm Under the recording/reproduction condition of 60 gigabits per 1 inch square, a signal-to-noise ratio of 20.2 dB was obtained, and the bit error rate was not more than $10^{-5}$. Accordingly, it could be confirmed to achieve a recording density of 60 gigabits per 1 inch square or more. In addition, for the medium of this example, the decreasing rate of a reproduced output over time was measured. The decreasing rate obtained by measuring the output reproduced from the record of the maximum linear recording density after 100 hours was not more than 2%. This medium was confirmed to be sufficiently suitable for maintaining record for a long period.

Hereinbefore, the present invention has been described in detail using the examples. In order to obtain a ratio of the grain diameter for the disc circumferential direction to the grain diameter for the disc radial direction of 0.9 or less, another method may be employed than the method of providing the fine grooves of a period shorter than the crystal grain diameter of the magnetic layer. For example, even by employing a method of obliquely sputtering the disc substrate with respect to the circumferential direction thereof in the formation of the underlayer by sputtering and suppressing growth of the grain diameter for the disc circumferential direction by a shadowing effect of the growing grain itself, a similar effect can be obtained.

According to the present invention, a magnetic recording medium which reduces the medium noise and is sufficiently stable with respect to the thermal fluctuation can be obtained. By using the magnetic recording medium of the present invention with a magnetic head having a high magnetoresistive effect, the magnetic recording apparatus with a recording density of 60 gigabits per 1 inch square or more can be realized.

What is claimed is:

1. A method for manufacturing a magnetic recording medium, comprising the steps of:
    laminating a substantially amorphous first underlayer, a second underlayer constituted of substantially polycrystal grains in contact with the first underlayer, and a magnetic layer on a disc substrate;
    forming fine grooves in a substantially circumferential direction of a substrate on a surface of the first underlayer, the fine grooves having an average period of roughness up to two times as large as an average crystal grain diameter of the magnetic layer; and
    forming a soft magnetic layer between the substrate and the first underlayer, wherein the magnetic layer has an easy magnetization direction directed to a direction substantially perpendicular to a surface of the substrate.

2. The method for manufacturing a magnetic recording medium according to claim 1, wherein the average period of the roughness is not more than the average crystal grain diameter of the magnetic layer.

3. The method for manufacturing a magnetic recording medium according to claim 1, wherein the roughness of the fine grooves has an average roughness factor Ra of no less than 0.3 nm and no more than 0.9 nm.

4. The method for manufacturing a magnetic recording medium according to claim 1, wherein the first underlayer and the second underlayer are formed by sputtering.

5. The method for manufacturing a magnetic recording medium according to claim 1, further comprising the step of:
    etching a surface of the first underlayer by sputtering, the first underlayer having the fine grooves formed thereon.

6. The method for manufacturing a magnetic recording medium according to claim 1, further comprising the step of
    etching a surface of the first underlayer using a cleaning solution, the first underlayer having the fine grooves formed thereon.

* * * * *